(12) United States Patent
Balasubramanian et al.

(10) Patent No.: US 12,244,907 B2
(45) Date of Patent: Mar. 4, 2025

(54) SYSTEM AND METHOD FOR AUTOMATED AUDIO TRANSITIONS IN A MULTI-WINDOW VIDEO ENVIRONMENT

(71) Applicant: ARRIS ENTERPRISES LLC, Suwanee, GA (US)

(72) Inventors: Sundaramoorthy Balasubramanian, Bangalore (IN); Baskaran Kandasamy, Dharmapuri (IN)

(73) Assignee: ARRIS Enterprises LLC, Horsham, PA (US)

( * ) Notice: Subject to any disclaimer, the term of this patent is extended or adjusted under 35 U.S.C. 154(b) by 230 days.

(21) Appl. No.: 17/945,284

(22) Filed: Sep. 15, 2022

(65) Prior Publication Data

US 2023/0097914 A1 Mar. 30, 2023

Related U.S. Application Data

(60) Provisional application No. 63/245,328, filed on Sep. 17, 2021.

(51) Int. Cl.
*H04N 21/485* (2011.01)
*H04N 5/45* (2011.01)

(52) U.S. Cl.
CPC ........... *H04N 21/4852* (2013.01); *H04N 5/45* (2013.01)

(58) Field of Classification Search
CPC ....... G06F 16/683; G06F 16/68; G06F 16/635
USPC ........................................................... 700/94
See application file for complete search history.

(56) References Cited

U.S. PATENT DOCUMENTS

| | | | |
|---|---|---|---|
| 11,360,634 B1 * | 6/2022 | Chang | G06F 3/0482 |
| 2007/0186269 A1 * | 8/2007 | Malik | G06F 3/0482 |
| | | | 348/E7.071 |
| 2008/0091437 A1 * | 4/2008 | Luu | G10L 21/01 |
| | | | 704/E21.018 |
| 2009/0064260 A1 * | 3/2009 | O'Callaghan | H04N 21/443 |
| | | | 725/131 |
| 2020/0301575 A1 * | 9/2020 | Lindholm | H04N 21/4821 |
| 2023/0091730 A1 * | 3/2023 | Kalathuru | H04N 21/44209 |
| | | | 725/139 |
| 2023/0097914 A1 * | 3/2023 | Balasubramanian | |
| | | | H04N 21/43072 |
| | | | 700/94 |

* cited by examiner

*Primary Examiner* — Alexander Krzystan
(74) *Attorney, Agent, or Firm* — Panitch Schwarze Belisario & Nadel LLP

(57) ABSTRACT

A system and method for enabling automated audio transitions in a multi-window video environment. This system and method provide for the autonomous selection of the audio associated with a particular one of the video windows based upon predetermined user preferences. The predetermined user preferences can be functions of the relative size and/or position of a particular video window, as well as the content, resolution, provider, or other characteristic associated with a particular video in a given window.

17 Claims, 7 Drawing Sheets

| User | Preferred Audio Source |
|---|---|
| Able | Primary |
| Baker | Secondary |
| Charley | None |
| Default | Primary |

FIG. 3

| User | Conditional Audio Preference Hierarchy |
|---|---|
| Able | 1. Live Sports<br>2. Live News<br>3. Video Conference<br>4. Movie<br>5. Cooking Programs |
| Baker | 1. Content from Provider B<br>2. Video Conference<br>3. Movie |
| Charley | None Specified |
| Default | Primary |

FIG. 7

SYSTEM AND METHOD FOR AUTOMATED AUDIO TRANSITIONS IN A MULTI-WINDOW VIDEO ENVIRONMENT

CROSS-REFERENCE TO RELATED APPLICATION

This application claims the benefit of U.S. Provisional Patent Application No. 63/245,328, filed Sep. 17, 2021, and entitled SYSTEM AND METHOD FOR AUTOMATED AUDIO TRANSITIONS IN A MULTI-WINDOW VIDEO ENVIRONMENT, which is incorporated by reference herein in its entirety.

BACKGROUND OF THE INVENTION

In today's media-rich environment it is not uncommon for an individual, or group of individuals, to simultaneously view multiple video programs. This can be accomplished by utilizing multiple individual screens, wherein each screen is dedicated to a single video program. However, using multiple screens can be both costly and cumbersome. A reasonable alternative is to employ a video appliance that supports presenting multiple video programs upon the same screen. This is typically accomplished with the multiple sources being presented in a picture-in-picture ("PIP") format (where one primary video program occupies the majority of the screen and one or more other programs are embedded as smaller "pictures" within the primary), or a picture-and-picture ("PAP") format (wherein the screen space occupied by each of the video each video program occupies an one or more video programs are concurrently displayed so that each occupies an approximately equal portion of the screen). PIP presentation of multiple video programs is well-known in the video system art. Typically, one of the programs is designated as primary and only the audio associated of that primary program is played through the speaker or audio system associated with the video system. A user typically can designate a particular video source as primary using an interface such as a remote control. In a typical PIP format, when a particular video source is so designated, it is switched to occupy the largest portion of the screen and the associated audio with it is ported to an associated speaker or audio system.

In a PAP presentation, where the area of the screen occupied by each video presentation is approximately equal, the primary program the program that was initially being displayed on the screen before other programs were added is typically the primary program by default. The audio associated with that primary program being ported to a speaker or audio system.

Previous systems supporting the PIP/PAP (hereinafter, "multi-picture) presentation of multiple video programs either defaulted to a given program as primary, or required a user to affirmatively designate a particular program as primary. The audio associated with the default/selected primary program would be ported to the audio system or speaker for the user to hear. Although the limitation of only playing audio associated with a primary video program is acceptable for many use cases, there are situations where a user desires audio from a non-primary video program to be played instead. Such use cases include video conferencing (where multiple participants, each in a separate video program, may need to heard from at the same time) or where multiple events are being watched. For example, if the primary video was a golf tournament and secondary video a football game. The user may consider golf to be best consumed on the larger format screen, while listening to the audio of the football game that is being presented as a component of a multi-picture display.

Accordingly, it would be desirable for a media system to autonomously provide a user with the audio of the particular video program based on predetermined user preferences. Ideally, the autonomous provision of audio could also be a dependent upon the type of content, the provider of the content and other arbitrary characteristics of video program or programs.

BRIEF SUMMARY OF THE INVENTION

A system and method for enabling automated audio transitions in a multi-window video environment. This system and method provide for the autonomous selection of the audio associated with a particular one of the video windows based upon predetermined user preferences. The predetermined user preferences can be functions of the relative size and/or position of a particular video window, as well as the content, resolution, provider, or other characteristic associated with a particular video in a given window.

BRIEF DESCRIPTION OF THE DRAWINGS

The aspects, and advantages of the present invention will become better understood with regard to the following description, appended claims, and accompanying drawings in which:

FIG. 3 is a representation of a first arrangement of preferred audio source information stored within the system of FIG. 1.

FIG. 7 is a representation of a third arrangement of preferred audio source information stored within the system of FIG. 1.

DETAILED DESCRIPTION

Figure 1:
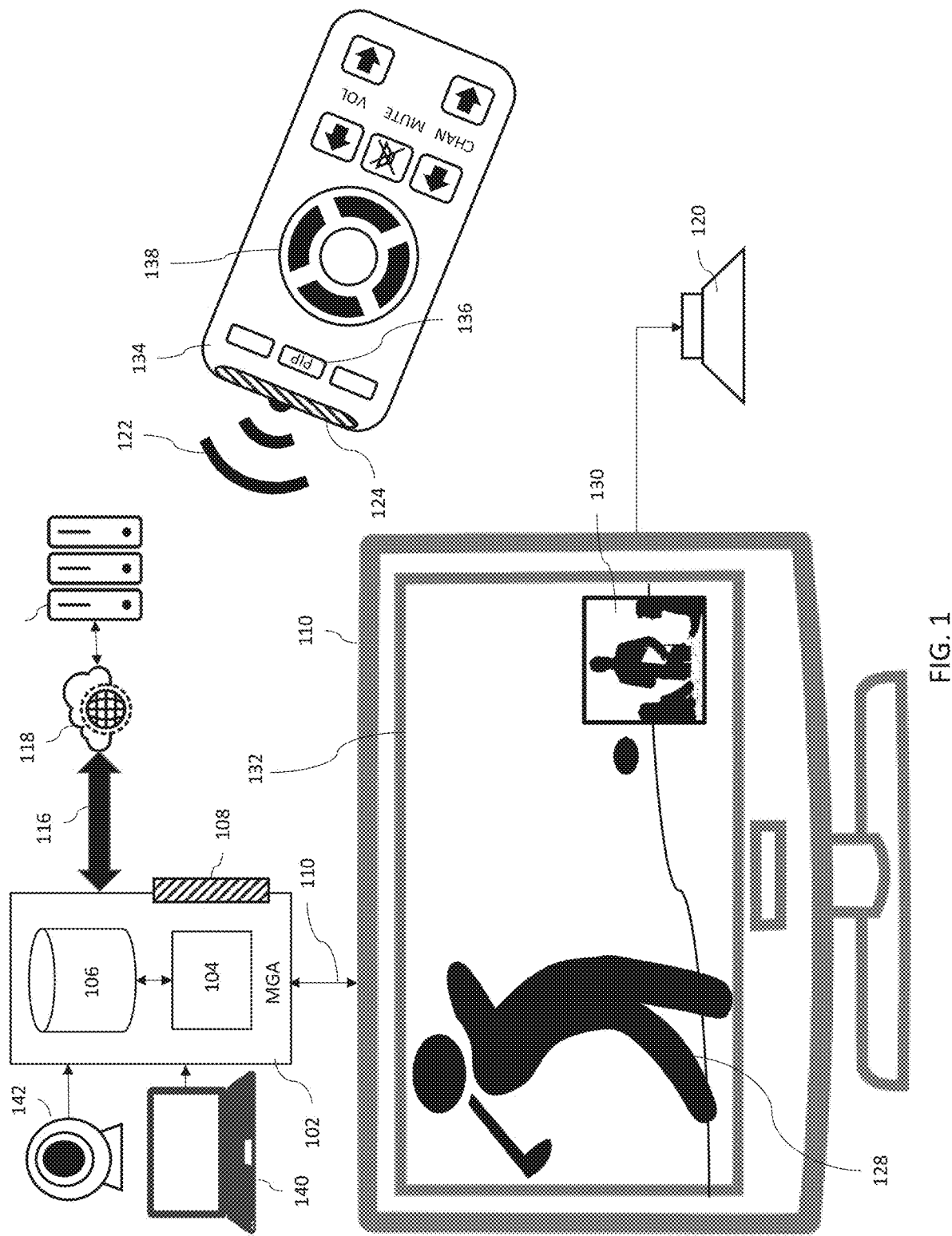
FIG. 1 is a functional block diagram of a preferred embodiment of a system adapted to provide automated audio transitions in a multi-window video environment.

FIG. 1 is a functional diagram of a preferred embodiment of a system (100) adapted to concurrently display multiple video programs and enable the autonomous selection of an audio program associated with one of the displayed video programs to be played via the speaker or audio system associated with the screen or television displaying the multiple video programs. As shown, system 100 comprises media gateway appliance ("MGA") 102, which includes processor 104, memory 106 and wireless receiver 108. MGA 102 is also shown to be linked to digital television 110 (via HDMI cable 112) and linked to headend 114 via broadband link 116 and network 118). Television 108 is also shown to be coupled to audio system 120, which is adapted to reproduce audio associated with the video program or programs being displayed. Wireless receiver 108 is adapted to be responsive to wireless signals 122, including radio-frequency signals (802.11 Wi-Fi, Bluetooth®, 802.15 Zig-Bee, etc.) or optical signals, produced by emitter 124 upon remote control 126.

MGA 102 functions as a primary appliance for the reception and presentation of digital video programs. These programs can include streaming and live video received from headend 114, as well as video programs stored in memory 106. MGA 102 is also adapted to permit the concurrent presentation of multiple video programs upon television 110 in the form of PIP displays presenting one video program as primary (full-screen) and one or more other videos as secondary (presented as reduced-size "pictures" superimposed upon the primary video). As shown in FIG. 1, MGA 102 is presenting primary video 128 (a golf tournament) as a full-screen video, and non-primary video program 130 (a live meeting).

Processor 104 is also adapted to modify the audio being routed to audio system 120 in accordance with user preferences stored in memory 106 when a user initiates a PIP display (132) utilizing remote-control 134. In particular, processor 104 detects if a user has actuated button 136 and then specified at least one secondary program utilizing pointing device 138 to navigate and select such from an on-screen menu (not shown). As shown in FIG. 1 the cursor has been manipulated so as to select a live meeting (130) as the non-primary video program overlaid upon primary video program 128 (a golf tournament).

Figure 2:
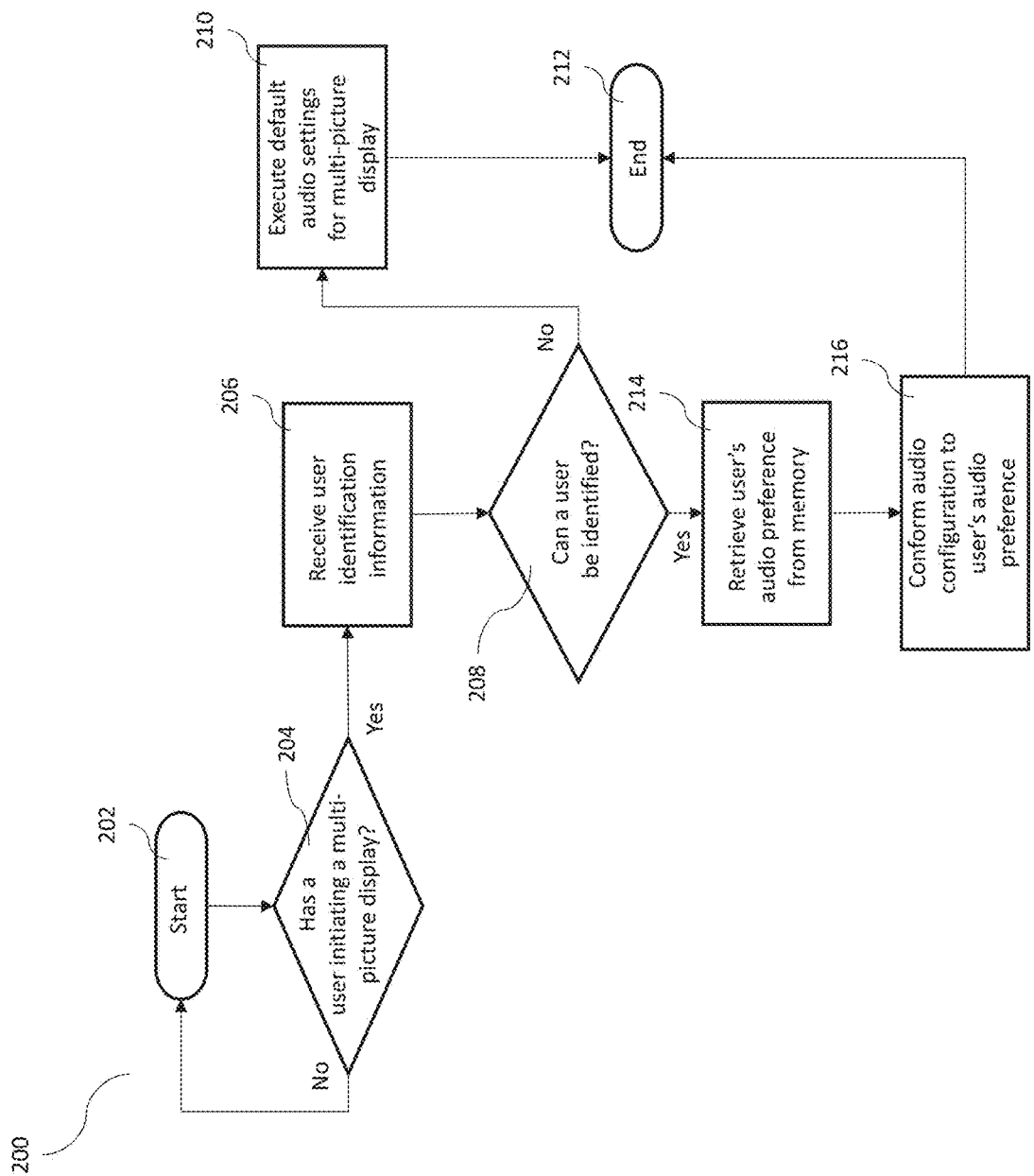
FIG. 2 is a process flow diagram of a first automated process for selecting which video-associated audio program (s) will be audible in the system of FIG. 1.

The process (200) executed by processor 104 when a PIP display is initiated by a user is shown in FIG. 2. The process begins with steps 202 and 204 wherein the user's actuation of buttons upon remote-control 134 is received and recognized as a request to display live meeting 130 as a component of PIP display. This results in an affirmative outcome of step 204 and the process continues with step 206. In step 206 processor 104 identifies the user. This identification is based upon a comparison of user identification data, stored in memory 106, with user identity information collected by MGA 102 when the user initiated the PIP display. This user identity information can include one or more of the following: recognition of the specific remote-control being utilized; the entry of a user-specific code via remote-control 134, or via some other input device such as a computer, tablet or digital assistant (140); facial recognition data supported by a camera (142) linked to MGA 102.

In step 208, if processor 104 cannot successfully correlate the collected user identification information with user identification data stored within memory 106, the process continues with step 210 and the default audio settings for PIP operation are executed. FIG. 3 provides a depiction (300) of preferred audio source information stored in memory 106 for three users—Able (302), Baker (304) and Charley (306). It also shows that information stored in memory 106 defines the default audio preference information (308) as enabling the audio associated with the primary video source to be played via audio system 120. The process then terminates at step 212.

However, if processor 104 is successful at correlating the collected user identification information with user identification data stored within memory 106, the process continues with step 214. Assume that the identified user is Baker. In step 214, processor 104 retrieves the preferred audio source data associated with Baker from memory 106. Based upon this retrieved data, processor 106 configures MGA 102 so as to route audio associated with the secondary video program (130) to audio system 120 (step 216). The process then terminates at step 212.

Figure 4:
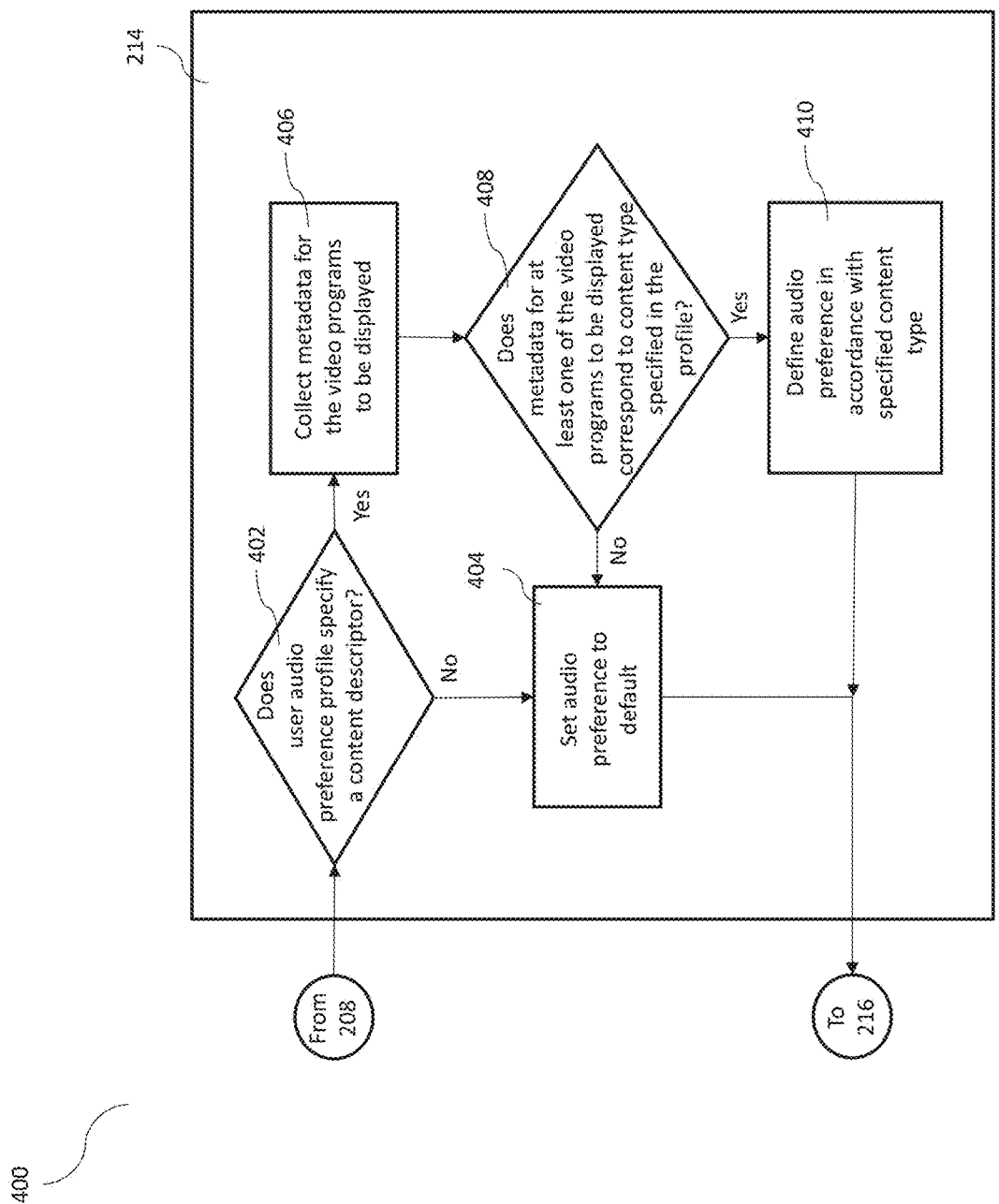
FIG. 4 a process flow diagram of a first process for the retrieval of a user's audio preference from memory within the system of FIG. 1.

FIG. 4 provides a process diagram of a process (400) for retrieving an enhanced audio preference profile from memory 106. Depiction of a first type of information (500) associated with such enhanced profiles is found in FIG. 5. As shown each user is associated with a particular type of program content descriptor: Abel with "Live Sports" (502), Baker with "Video Conference" (504), and Charley with "Content from Provider A" (506). FIG. 2 also shows that the default audio source is "Primary" (508).

Figure 5:
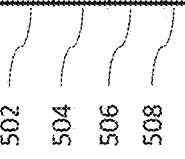
FIG. 5 is a representation of a second arrangement of preferred audio source information stored within the system of FIG. 1.

As previously described, once the process depicted in FIG. 2 arrives at step 214, an identified user's audio preference is retrieved from memory 106. The process steps shown in FIG. 4 are all executed by processor 104 within step 214 of FIG. 2. In step 402, processor 104 determines if the identified user's audio preference profile specifies particular content types (genre of show, live, recorded, animation, content provided by a particular provider, primary language spoken in the content, color, high-definition, over-the-top content, etc.). If not, the process continues with step 404 and the audio preference is set to default, which, as shown in FIG. 5, is audio associated with the primary video (508).

If at step 402 it is determined that the user's audio preference profile does specify particular content types, processor 104 collects available metadata for the video programs that are to be displayed in the PIP (step 406). Metadata is commonly provided by content providers and can include a wide-range of program information, including the genre of the programming, program title, cast, video resolution, date first released or aired, language, source/provider, duration, etc. In the present embodiment assume that the identified user is "Charley" and the preferred audio source is "Content from Provider A". In addition, assume that the metadata associated with golf tournament program (128) indicates that it is provided by Content Provider A.

Upon making the determination, based upon metadata, that the golf tournament is provided by Provider A and that such metadata directly relates to the content type specified in the profile for Charley (affirmative outcome of step 408), processor 104 defines the preference for user Charley to be audio associated with the golf tournament (step 410). The process then continues with step 216 (see FIG. 2). If step 408 resulted in a negative outcome, processor 104 would set the audio preference for user Charley to default, which as shown in FIG. 5 (508) is the audio associated with the primary video (the golf tournament).

Figure 6:
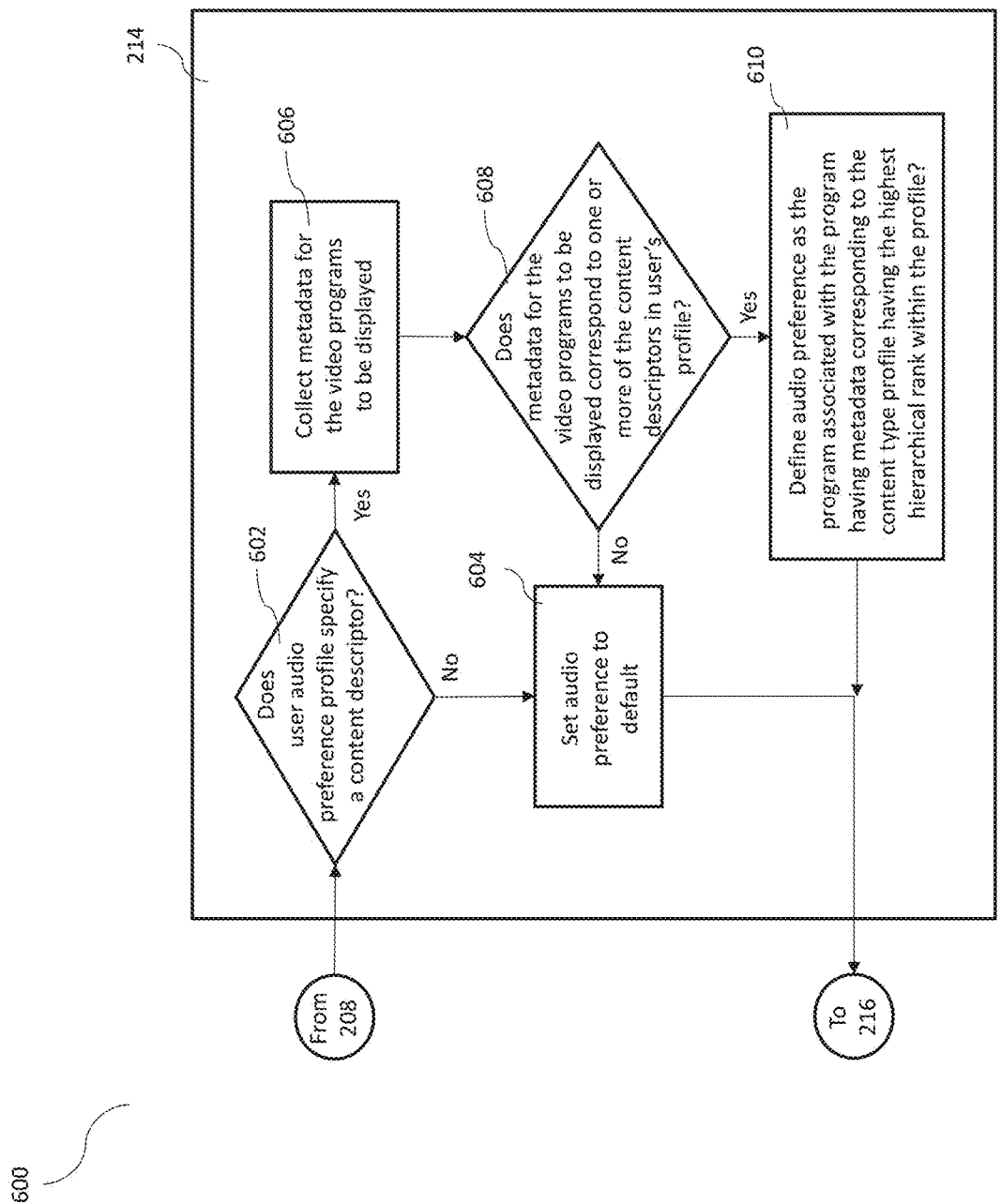
FIG. 6 a process flow diagram of a second process for the retrieval of a user's audio preference from memory within the system of FIG. 1.

FIG. 6 provides a process diagram of a process (600) for retrieving an alternate type of enhanced audio preference profile from memory 106. A depiction of this alternate type of information (700) associated with enhanced profiles is provided in FIG. 7. As shown, the profiles for users Abel and Baker each include a hierarchical listing of program descriptors. Abel's profile (702) shows a listing of five such descriptors ranging from the highest ranked ("Live Sports") to the lowest ("Cooking Programs"). Baker's profile (704) has "Content from provider B" listed as highest ranked, and "Movie" as the lowest. User Charley has no specified content ranking stored in memory 106 (796), and the default audio preference is shown to be the "Primary" video (710).

Steps 602, 604 and 606 are similar to respective steps 402, 404 and 406 of FIG. 4. However, once the metadata for the video programs has been collected in step 606, the process continues with step 608. In step 608 processor 106 determines if the metadata associated with the video programs to be displayed as part of the PIP correspond to one or more of the descriptors in the user's profile. In this embodiment, the user has been identified as Baker, and the metadata data identifies golf tournament 128 as "Live Sports" and video conference 130 as "Video Conference". The determination by processor 104 determines that the "Live Sports" metadata of golf tournament 128 fails to correspond to any of the descriptors in Baker's audio preference hierarchy, and that the "Video Conference" metadata of video conference 130 corresponds to the second highest ranked descriptor in Baker's profile.

Upon making this determination, processor 104 proceeds with step 610 wherein it defines the preference for user Baker to be audio associated with video conference 130 (step 610). The process then continues with step 216 (see FIG. 2). If step 608 resulted in a negative outcome, processor 104 would set the audio preference for user Baker to default, which as shown in FIG. 7 (708) is the audio associated with the primary video (the golf tournament).

The above embodiments have focused on the application of the invention in PIP environments. However, the technology is readily applicable in PAP environments. The primary video being the initial video displayed upon a given screen, or any one of the two or more videos sharing equal screen areas. The designation of "primary" being an arbitrary label that could be user specified or designated by a default condition programmed into the instructions for processor 104. For example, the video occupying the left most portion of the screen could be designated as the default primary video. As additional videos are added to the screen by a user, processor 104 would apply the same processes as detailed above for a PIP implementation (see FIGS. 2, 4 and 6).

Although the invention herein has been described with reference to particular embodiments, it is to be understood that these embodiments are merely illustrative of the principles and applications of the present invention. For example, the MGA can be a stand-alone device such as a set-top box, or integrated into another system or device such as a television, a digital assistant, smartphone, tablet or a computer. The functionality of the MGA could also be provided by a system or systems that are no co-located with the television being utilized to display the video programs; this functionality could be linked to the television and or user via a network. In addition, the PIP or PAP video program is not limited to being displayed upon a digital television. A computer monitor, a tablet, a smartphone, a laptop or other suitable display device could be utilized. It will also be understood that the wireless receiver for receiving remote control commands could be integrated into the television or other display supporting the PIP/PAP display.

The invention claimed is:

1. A system for the provision of automated audio transitions in a multi-window video environment, the system comprising:
   at least one memory storing data indicative of at least one audio preference associated with at least one user; and
   at least one media gateway appliance comprising at least one processor, wherein the at least one processor is adapted to:
   concurrently display at least two video programs upon a single display wherein one of the at least two video programs is displayed as a primary video, and at least one other of the at least two video programs is displayed as a secondary video;
   receive at least one indicator indicative of the identity of a user;
   retrieve at least one audio preference from the at least one memory, based, at least in part, upon the received at least one indicator;
   select one of the at least two video programs, based, at least in part, upon the at least one audio preference;
   play audio associated with the selected video program based on the at least one audio preference; and
   mute audio associated with any non-selected video programs based on the at least one audio preference.

2. The system of claim 1 wherein the selection of one of the at least two video programs is also based, at least in part, upon meta data associated with the at least two video programs.

3. The system of claim 1 wherein the selection of one of the at least two video programs is also based, at least in part, upon at least one of the following video program characteristics:
   genre;
   title;
   release date;
   resolution;
   cast;
   language;
   position on screen; and
   size upon the single display relative to other video programs being concurrently displayed.

4. The system of claim 1 wherein the at least one indicator indicative of the identity of a user comprises at least one of the following:
   facial recognition data;
   a user name;
   a user-specific code; and
   an identifier associated with a particular user interface device.

5. The system of claim 1 wherein the at least one audio preference comprises a hierarchical list of a plurality of video program characteristics.

6. The system of claim 1 wherein the multi-window video environment comprises at least one of the following:
   a picture-in-picture display; and
   a picture-and-picture display.

7. The system of claim 1 wherein the single display comprises one of the following:
   a television;
   a digital assistant;
   a smartphone;
   a tablet; and
   a computer monitor.

8. The system of claim 1 wherein the media gateway appliance comprises one of the following:
   a set-top box;
   a television;
   a digital assistant;
   a smartphone;
   a tablet; and
   a computer.

9. The system of claim 1 wherein the at least one gateway media appliance further comprises a wireless signal receiver adapted to receive wireless signals indicative of the user commands and communicate such to the at least one processor.

10. The system of claim 9 wherein the wireless signals comprise at least one of:
    optical signals; and
    radio-frequency signals.

11. A method for the provision of automated audio transitions in a multi-window video environment, in a system comprising:
- at least one memory storing data indicative of at least one audio preference associated with at least one user;

the method comprising the steps of:
- concurrently displaying at least two video programs upon a single display wherein one of the at least two video programs is displayed as a primary video, and at least one other of the at least two video programs is displayed as a secondary video;
- receiving at least one indicator indicative of the identity of a user;
- retrieving at least one audio preference from the at least one memory, based, at least in part, upon the received at least one indicator;
- selecting one of the at least two video programs, based, at least in part, upon the at least one audio preference;
- playing audio associated with the selected video program based on the at least one audio preference; and
- muting audio associated with any non-selected video programs based on the at least one audio preference.

12. The method of claim 11 wherein the selection of one of the at least two video programs is also based, at least in part, upon meta data associated with the at least two video programs.

13. The method of claim 11 wherein the selection of one of the at least two video programs is also based, at least in part, upon at least one of the following video program characteristics:
- genre;
- title;
- release date;
- resolution;
- cast;
- language;
- position on screen; and
- size upon the single display relative to other video programs being concurrently displayed.

14. The method of claim 11 wherein the at least one indicator indicative of the identity of a user comprises at least one of the following:
- facial recognition data;
- a user name;
- a user-specific code; and
- an identifier associated with a particular user interface device.

15. The method of claim 11 wherein the at least one audio preference comprises a hierarchical list of a plurality of video program characteristics.

16. The method of claim 11 wherein the multi-window video environment comprises at least one of the following:
- a picture-in-picture display; and
- a picture-and-picture display.

17. The method of claim 11 wherein the single display comprises one of the following:
- a television;
- a digital assistant;
- a smartphone;
- a tablet; and
- a computer monitor.

* * * * *